Patented Jan. 7, 1936

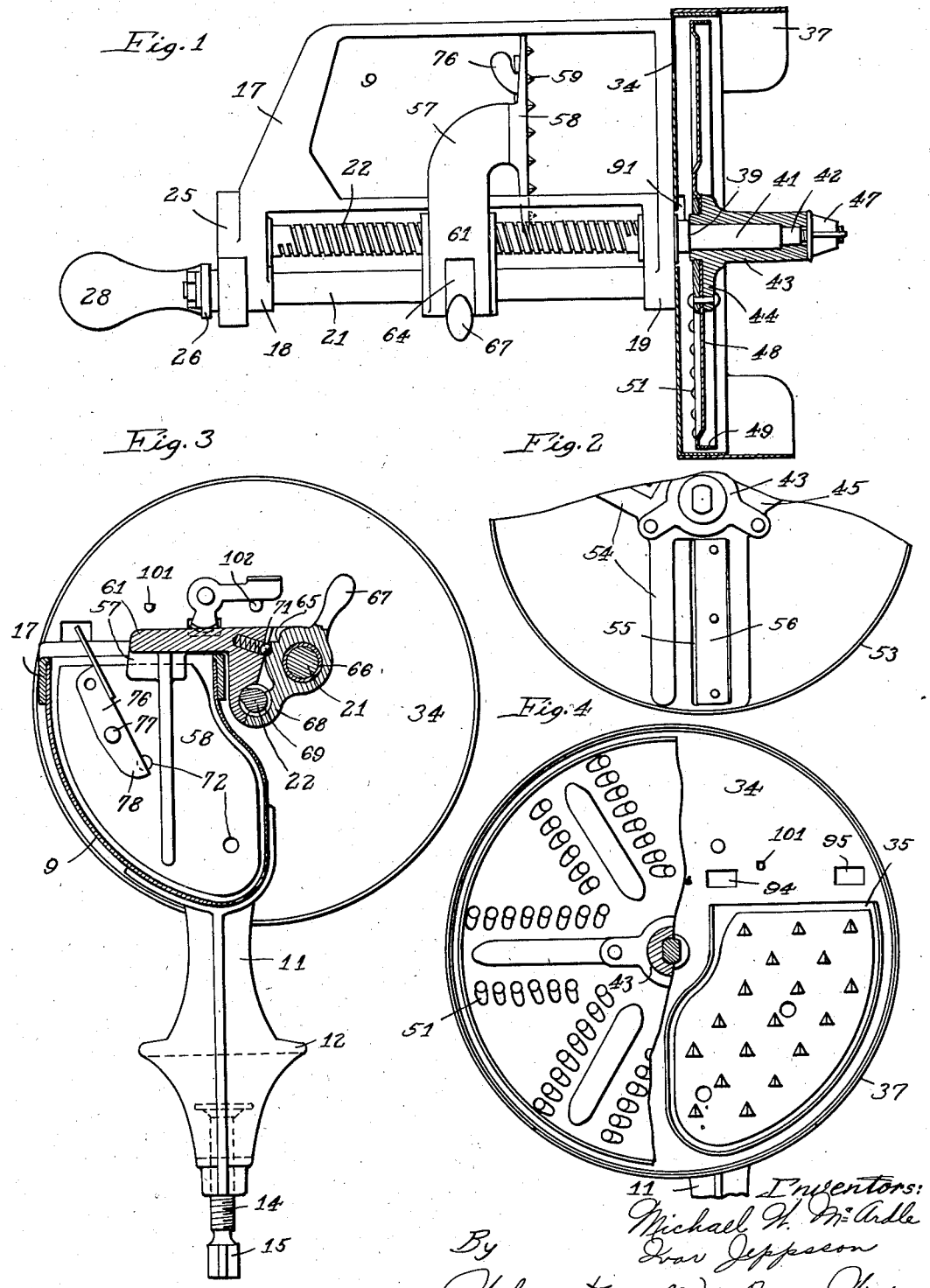

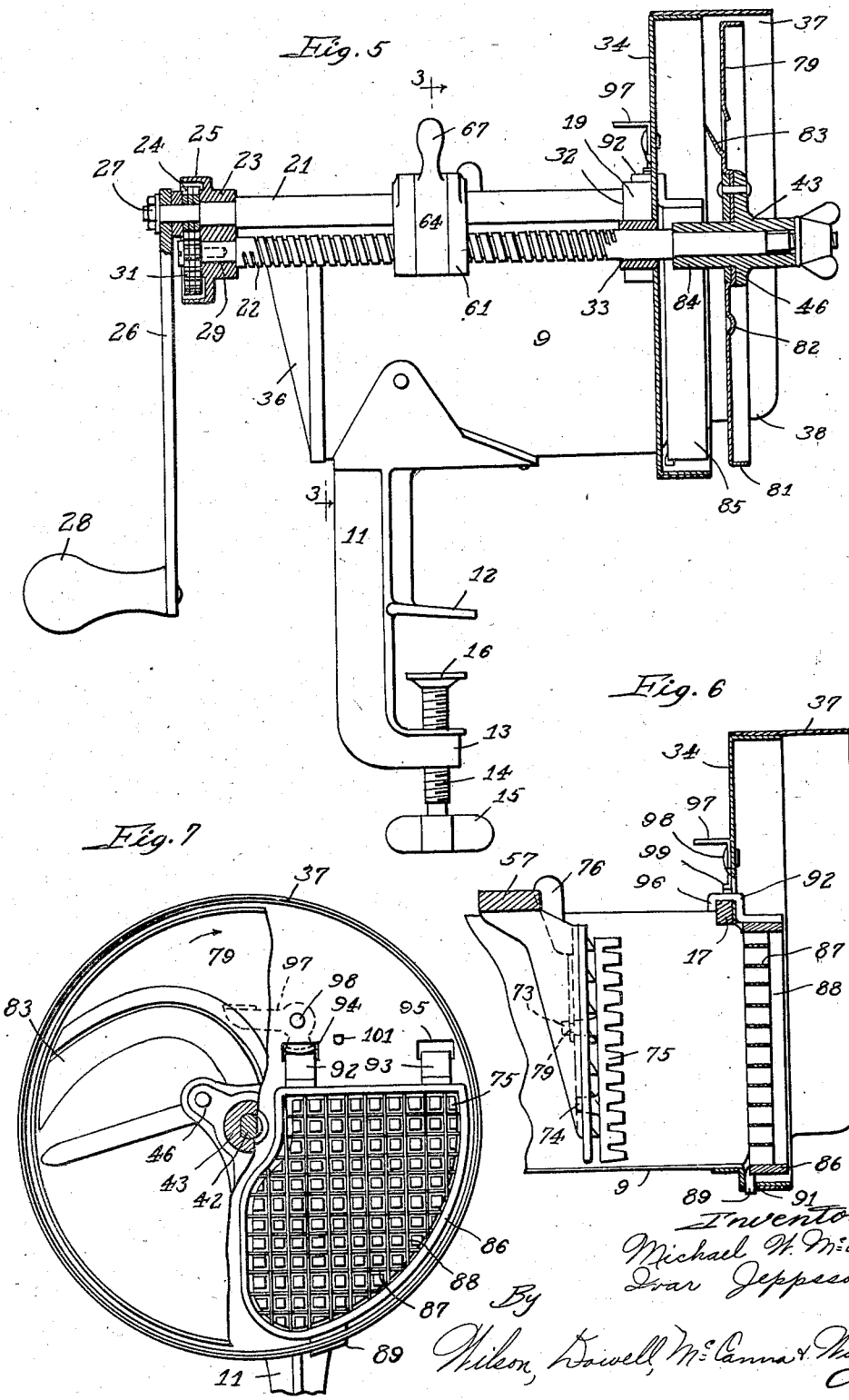

2,026,691

UNITED STATES PATENT OFFICE 2,026,691

COMBINED SLICER, SHREDDER, AND DICER

Michael W. McArdle and Ivar Jeppsson, Chicago, Ill., assignors to Chicago Flexible Shaft Company, Chicago, Ill., a corporation of Illinois Application March 29, 1934, Serial No. 717,914

2 Claims. (Cl. 146—113)

This invention relates to food cutting machines and has particular reference to a device for selectively slicing, shredding, cubing, and rodding vegetables.

The cutting operations commonly performed on vegetables or like material in the course of their preparation as food are of four general types. In one type parallel cuts are made in one direction across the vegetable which results in slices. In a further type, parallel cuts in two directions at right angles to each other are made forming square rods, such as used for French fried potatoes, and the like. In a third type, parallel cuts in three directions are made forming cubes, and in a fourth type the vegetable is shredded or grated by flaking off small particles of the vegetable. While slicing and grating devices of various types were well known in the art, prior to my invention there has been no simple and inexpensive device for rodding or cubing vegetables, so far as I am aware, or for combining the functions of slicing, grating, rodding and cubing in a single compact machine selectively operative to perform the various operations.

An object of the invention is to produce a simple mechanism by means of which the several operations commonly performed in the preparation of vegetables and other foods may be expeditiously carried out through a single apparatus by an interchange of parts adapted to modify the character of the cutting operation.

A further object of the invention is the provision of a food cutter of simple and inexpensive form for the cutting of vegetables into cubes and rods.

Another object of the invention is the provision of a food cutter arranged for interchangeable use as a slicer, a dicer, and a rod cutter.

A still further object of the invention is the provision of improved cutter and feeding mechanism for vegetable cutters.

Other objects and attendant advantages will become apparent to those skilled in the art from the following description and the accompanying drawings, in which—

Figure 1 is a top view of a cutter arranged to carry out the shredding operation, the cutter guard and cutter plate being shown in section;

Fig. 2 is a fragmentary face view of a cutter plate for slicing;

Fig. 3 is a section on the line 3—3 of Fig. 5;

Fig. 4 is a face view of the cutter plate as shown in Figure 1, the cutter plate being partially broken away and the hub being in a section to show the method of driving the cutter plate;

Fig. 5 is a side view partly in section showing the device arranged for cubing;

Fig. 6 is a section through the hopper and the guard showing the device arranged for rodding, and Fig. 7 is a view similar to Fig. 4 showing the device arranged for cubing.

Referring first to Figs. 1-4, inclusive, wherein the device is shown arranged to perform slicing and shredding operations, the numeral 9 designates a hopper within which the vegetable or other material is to be operated upon in this position. A vertical supporting member or table clamp designated generally by the numeral 11 is secured to the bottom of the hopper and has the usual spaced fingers 12 and 13 (Fig. 5), the finger 13 carrying a screw 14 having a wing nut 15 and a foot 16. The device is designed for attachment to a table in the usual way by clamping on the edge of the table. A frame 17 surrounds the open top of the hopper 9 and serves to reenforce the hopper as well as support a part of the operating mechanism. The frame carries arms 18 and 19 adjacent to opposite ends of the frame and projecting laterally outward in the same direction. Spaced spindles 21 and 22 are supported between the arms 18 and 19 and extend longitudinally of the hopper 9 along one side thereof, the spindle 22 having external threads, as best shown in Figures 1 and 5. The spindle 21 has bearing in the arm 18, as shown at 23 in Fig. 5, and carries a gear 24 enclosed within a housing 25 on the arm 18. A crank 26 is secured to the end of the spindle 21 by means of a nut 27 and carries a handle 28 for rotation of the spindle 21. The spindle 22 is likewise journaled in the arm 18 as shown at 29, and carries a gear 31 meshing with the gear 24 and enclosed in the housing 25. The opposite ends of the spindles 21 and 22 have bearing support in the arm 19 of the frame, as shown at 32 and 33.

A circular guard disk 34 is attached to the end of the hopper 9 against the arm 19 of the frame, and has an opening 35 therethrough for discharge of material from the hopper, the opposite end of the hopper being closed by a plate 36. The guard plate 34 has an annular flange 37 attached thereto and extending away from the body of the disk so as to enclose the cutter plate presently to be described. The lower end of the flange 37 is cut away, as shown at 38, to facilitate the discharge of the cut material into a suitable receptacle.

The spindle 22 extends beyond the arm 19 and has a shoulder 39, a portion of reduced diameter 41, and a flattened portion of still further reduced diameter 42 for the reception of the hub 43 of any of the cutter plates designated generally by the numerals 44, 45 and 46. The hub 43 has a flattened opening for the reception of the portion 42, as best shown in Fig. 4. A knurled nut 47 serves to draw the hub 43 against the shoulder 39 to firmly secure the cutter plate to the spindle 22.

Referring to Figures 1 and 4, the cutter plate 44 includes a sheet metal disk 48 having an annular flange 49 for stiffening purposes and provided with a plurality of shredding cutters 51 formed by striking up portions of the sheet metal of the disk. In Fig. 2, the cutter 45 consists of a sheet metal disk 52 having an annular flange 53 and a plurality of radial stiffening ribs 54. The disk is slotted, as shown at 55, and a blade 56 is secured in the slot so as to project from the face of the cutter opposite that shown in Fig. 2 a distance equal to the thickness of the slice to be taken from the vegetable.

Referring now to Figures 1 and 3, a food pusher, designated generally by the numeral 57, has a pusher plate 58 within the hopper having an annular shape to conform to the configuration of the hopper and carrying a plurality of spikes 59 on its forward face for engaging the material in the hopper. The pusher also has an arm 61 carried on the spindle 21 and fixedly secured to the plate 58. The arm 61 also encloses the spindle 62, as best shown in Fig. 3, and has a latch designated generally by the numeral 64, supported in a slot 65 thereof. The latch member 64 is pivotally supported on the spindle 21, as shown at 66, and has a lever 67 for rotation thereof about the spindle independently of the arm 61. The latch has a portion 68 extending into contact with the spindle 22 and having threads 69 for engagement with the threads on the spindle 22. When the latch 64 occupies the position shown in Fig. 3, the pusher 57 will be fed forward in the hopper 9 upon rotation of the crank 26. A spring and ball latch 71 serves to retain a latch in the engaged position shown in Fig. 3 or in a disengaged position with the portion 68 of the latch out of contact with the spindle 22.

The pusher plate 58 has spaced openings 72 for the reception of pins 73 and 74 of a cubing plate designated generally by the numeral 75 and best shown in Fig. 6. A lever 76 is attached to the back of the pusher plate 58 by means of a pin 77 and is rotatable thereabout to bring the end 78 thereof into a slot 79 in the pin 73 so as to retain the cubing plate 75 against the pusher plate 58.

The cutter plate 46 is similar to the plates 44 and 45 in many respects and consists of a sheet metal disk 79 having an annular stiffening flange 81 and radial stiffening ribs 82. The plate also has a curved cutter blade 83 struck out from the material and extending away from the inner face a distance equal to the depth of the cut, as will presently appear. However, this cutter plate differs from those previously described in that the hub 43 thereof has a portion 84 between the disk 79 and the shoulder 39 to space the cutter from the guard plate 34. Interposed in the space between the rotary cutter plate and the guard plate 34 is a stationary cutter 85, best shown in Figs. 6 and 7. This consists of a frame 86 shaped to conform substantially with the discharge opening 35 of the hopper, the frame 86 having a plurality of parallel cutter blades 87 extending thereacross in one direction and a plurality of cutter blades 88 extending thereacross at right angles to the cutter blades 87 whereby to form rectangular openings between the cutter blades, as best shown in Fig. 7. The frame 86 carries a finger 89 adapted to extend through an opening 91 in the bottom of the annular flange 37 and a pair of fingers 92 and 93 attached to the top of the frame 86 and extending through openings 94 and 95 in the guard disk 34. The free ends 96 of the fingers 92 and 93 extend downward to enclose the forward end of the frame 17, as shown in Fig. 6. A bell crank lever 97 is pivotally mounted on the guard disk 34 through a pin 98 and carries on the extremity of one arm an arcuate cam 99 adapted to engage the finger 92 and urge the same firmly downward against the front end of the frame 17 to retain the stationary cutter 85 in position and prevent the force of the cutting operations from urging the cutter upward so as to release the same from its position across the discharge opening of the hopper. Limit buttons 101 and 102 limit the movement of the bell crank lever 97.

Directing attention now more particularly to the method of operating the device and calling attention to Fig. 5, food to be diced such for example as beets, or carrots, is placed in the hopper 9, the latch 64 being opened and the pusher 61 being drawn backward to bring the plates 58 and 75 to the rear of the hopper. The latch 64 is then engaged and upon rotation of the handle 28 the vegetable will be forced through the stationary cutter 86. On passing through this cutter it will be cut into the form of square rods and as they emerge from the stationary cutter the rotary cutter plate 46 will intermittently sever the emerging material, causing the same to be cut into cubes. Attention is directed to the fact that the rate of feed, that is, the piece of the screw on the spindle 22 is so coordinated with the depth of the cut made by the cutter 83 and with the spacing of the stationary cutter blades 87 and 88 that the material will be advanced on each revolution of the cutter plate a distance equal to the spacing of the cutter blades 87 and 88, which in turn is substantially the same as the depth of cut made by the cutter 83 and consequently the finished material will be true cubes.

However, it is frequently desirable to cut raw potatoes for the purpose of making French fried potatoes, in this case the potato being cut in the form of rods. In accomplishing this operation, the cutter plate 46 is removed and the potatoes are simply extruded through the stationary cutter 86. In this connection, it should be observed that the surface of the cubing plate 75 is provided with projecting cubes of substantially the cross-sectional area of the openings between the cutter plates 87 and 88 and at the end of the stroke of the pusher plate 61, these projecting cubes move into the spaces of the cutter plates 87, causing the last traces of food to be forced through the stationary cutter and preventing any of the material from being retained in the rectangular openings between the blades 87 and 88.

To perform the usual slicing, shredding and grating operations, the stationary cutter 86 is removed by rotating the bell crank lever 97 to release the finger 92 and thereafter lifting the stationary plate to disengage the finger 98 whereupon the stationary cutter may be conveniently removed. Likewise, the lever 76 carried on the pusher plate 58 is rotated to an extent sufficient for the removal of the cubing plate 75. Either of the cutter plates 44 or 45 are then placed on the spindle 22 depending upon the type of operation desired.

Special attention is directed to the fact that we have provided simple and convenient means for cubing and rodding vegetables wherein it is only necessary to toss the vegetables into a hopper and turn the crank 26 to obtain either a cubed or rodded product. Likewise, by a simple removal of parts this device may be converted into a slicer and shredder. Through thus combining the functions into a single simple machine, the user is able to perform operations heretofore obtainable only with complicated and highly expensive machines, and to perform these operations with a single machine and not a multiplicity.

While we have thus described and illustrated a specific embodiment of our invention, we are aware that numerous alterations and changes may be made therein without departing from the spirit of the invention and we do not wish to be limited except as required by the prior art and the scope of the appended claims, in which—

We claim:

1. In a combined slicer and dicer having a rotary cutter, means for driving the cutter, a hopper provided with a discharge opening in close proximity to the cutter, and means for feeding the material in the hopper through said discharge opening and into said cutter, the combination therewith of a rotary cutter replacing said first mentioned cutter and supported in predetermined spaced relation to said discharge opening, said spacing being greater than the spacing of the first mentioned rotary cutter providing a space for the reception of a stationary cutter a stationary cutter positioned across said discharge opening between said opening and the last mentioned rotary cutter comprising a lattice of cutter blades forming a plurality of extrusion openings, and a pressure plate carried on said feeding means, the plate having a cubed surface for entry into said extrusion openings to force the material therethrough.

2. In a combined slicer and dicer, a hopper provided with a discharge opening, a spindle adapted to selectively support and drive any of a plurality of rotary cutters adjacent said opening, including a rotary dicing cutter supported in spaced relation thereto to cut material discharged therefrom and a slicing cutter directly adjacent said opening, a rotary dicing cutter on the spindle, means for feeding the material in said hopper through said discharge opening, a stationary dicing cutter having a rectangular lattice of cutter blades, releasable means for supporting the stationary cutter across the discharge opening and beyond the same when the rotary dicing cutter is supported on the spindle, and releasable supplementary feeding means for feeding the material beyond said discharge openings and through the stationary cutter.

MICHAEL W. McARDLE.
IVAR JEPPSSON.